T. A. HALLERAN.
LICENSE PLATE HOLDER FOR AUTOMOBILES.
APPLICATION FILED JUNE 27, 1917.
1,280,452.
Patented Oct. 1, 1918.
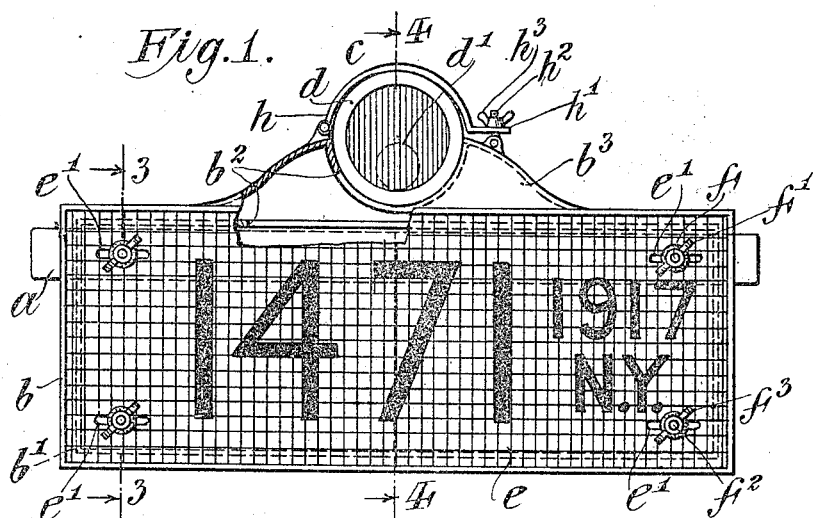
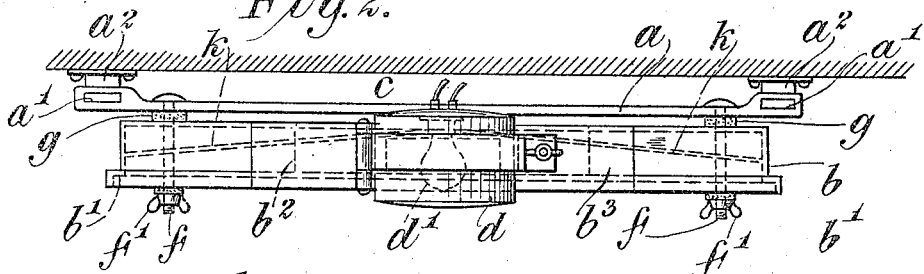
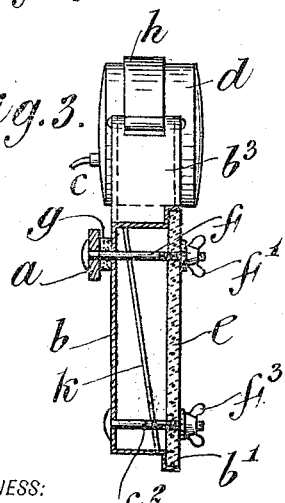
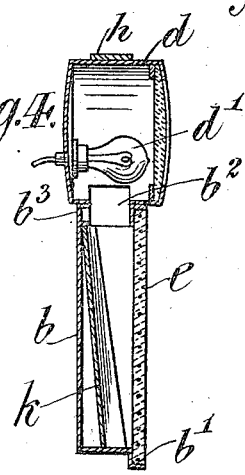
WITNESS:
INVENTOR
Thomas A. Halleran
BY
Redding, Greeley
ATTORNEYS

UNITED STATES PATENT OFFICE.

THOMAS A. HALLERAN, OF FLUSHING, NEW YORK.

LICENSE-PLATE HOLDER FOR AUTOMOBILES.

1,280,452.　　　　Specification of Letters Patent.　　Patented Oct. 1, 1918.

Application filed June 27, 1917. Serial No. 177,167.

*To all whom it may concern:*

Be it known that I, THOMAS A. HALLERAN, a citizen of the United States, and residing in the town of Flushing, Queens county, in the State of New York, have invented certain new and useful Improvements in License-Plate Holders for Automobiles, of which the following is a specification, reference being had to the accompanying drawings, forming a part hereof.

The object of this invention is to provide an improved license plate holder for automobiles which can be readily attached to the automobile, can be assembled readily with the usual rear light and shall provide for effective illumination of the number-plate so that it shall be distinguishable at night. The invention will be more fully explained hereinafter with reference to the accompanying drawing in which it is illustrated and in which,—

Figure 1 is a view in rear elevation of the improved plate-holder.

Fig. 2 is a top view of the same.

Fig. 3 is a view in section on the plane indicated by the broken line 3—3 of Fig. 2, looking in the direction of the arrows.

Fig. 4 is a view in section on the plane indicated by the broken line 4—4 of Fig. 2, looking in the direction of the arrows.

The improved plate-holder comprises a bracket or bar $a$ adapted to be secured to the automobile, a casing $b$, with means for securing it detachably to the bracket or bar $a$, and means, indicated at $c$, for securing together the plate-holder and the usual red light $d$.

In the construction shown in the drawing the bar or bracket $a$ is provided at its ends with slots $a'$ for engagement with the usual brackets $a^2$, provided on the automobile for holding the license-plate. The bar or bracket $a$, being made detachably from the plate-holder proper, can be replaced by one or another adapted for an automobile of one make or another. The casing $b$ is a generally rectangular casing made of sheet metal, and provided in its rear or outer face with a seat $b'$ to receive the license-plate $e$, which may be of metal with cut-out letters and figures, or of tough glass or porcelain on which the letters and figures are painted with opaque paint.

The casing $b$ is secured to the bar or bracket $a$ and the license-plate $e$ is secured to the casing by headed bolts $f$ which engage the bar or bracket $a$ and are provided at their rear or outer ends with thumb nuts $f'$, the bolts $f$ passing through slotted openings $e'$ in the license-plate. Cushioning washers $g$ are preferably interposed between the bar or bracket $a$ and the forward or inner face of the casing $b$ for the purpose of preventing rattling. The top of the casing is provided with a longitudinal opening $b^2$, shown in Fig. 4, through which the rays of light may fall from the source of light $d'$ within the usual lamp $d$, and the top of the casing $b$ is also provided with a supplemental casing $b^3$, shaped substantially as shown in Fig. 1, so as to cover the opening $b^2$ and also to form a seat for the lamp $d$. A flexible strap $h$, preferably of metal, is hingedly secured at one end to the casing $b$ and at the other end is provided with an ear $h'$ apertured or slotted to receive a bolt $h^2$ also hingedly mounted on the casing and adapted to receive a thumb nut $h^3$ above the ear $h'$. By this means the casing and the lamp can be secured together tightly and easily, the strap $h$ and the bolt $h'$ permitting ready adaptation of the fastening means to lamps of different sizes.

In order that the license-plate may be generally illuminated from within by the rays of light which fall from the source of light above the casing there are placed within the casing mirrors $k$ which are inclined rearwardly toward the top, away from the vertical plane, and are also inclined rearwardly toward the middle, away from the license-plate, so that the rays of light from the source of light centrally located above the casing shall be reflected generally toward the inner face of the license-plate and therefore cause it to be more generally and strongly illuminated from within.

It will be understood that the upper bolts $f$ only pass through the supporting bar or bracket $a$ and that the lower bolts $f^2$ and their thumb nuts $f^3$ serve only to hold the license-plate to its seat in the casing, the heads of the bolts bearing directly against the rear wall of the casing.

It will be obvious that various changes in details of construction and arrangement may be made to suit different conditions of use.

I claim as my invention:

1. A license plate holder for automobiles, comprising a casing adapted to receive an illuminated license-plate in its rear face, means to support a source of light, a supporting bar or bracket, and bolts passed forwardly through the supporting bar or bracket, the casing and the license-plate, and provided with nuts outside of the license-plate.

2. A license plate holder for automobiles, comprising a casing adapted to receive an illuminated license-plate in its rear face, and having an opening through its top, a supplemental casing covering such opening and forming a seat for a lamp, and a flexible band hingedly secured to the casing at one end and adapted to encircle the lamp, and a bolt hingedly secured to the casing on the opposite side of the lamp seat, and having a nut to engage the corresponding end of the strap whereby the casing and lamp may be held firmly in assembled relation.

This specification signed this 22nd day of June, A. D. 1917.

THOMAS A. HALLERAN.